United States Patent Office 3,433,024
Patented Mar. 18, 1969

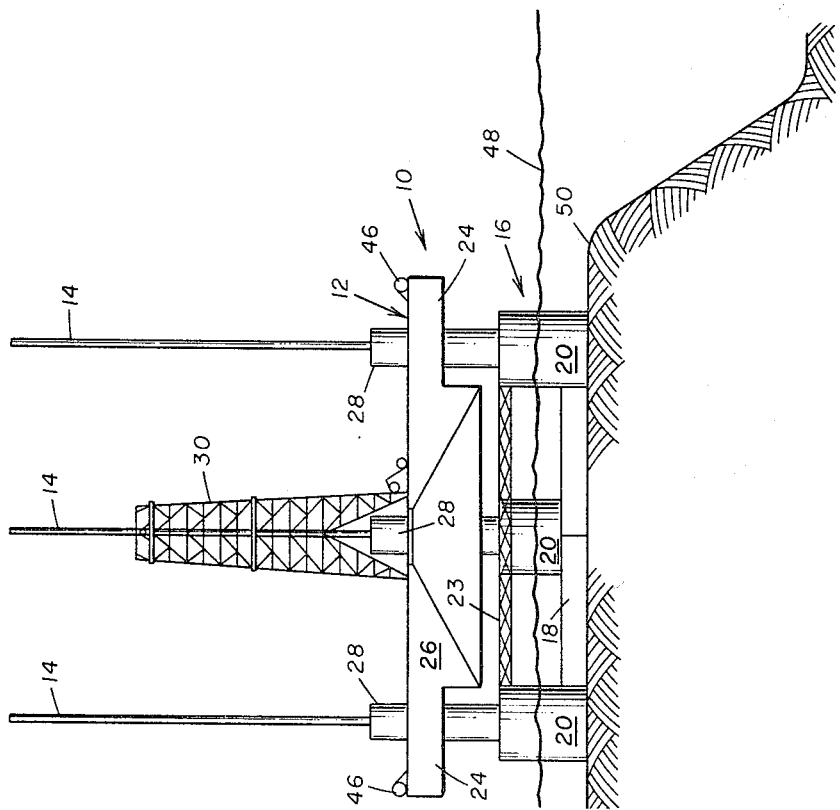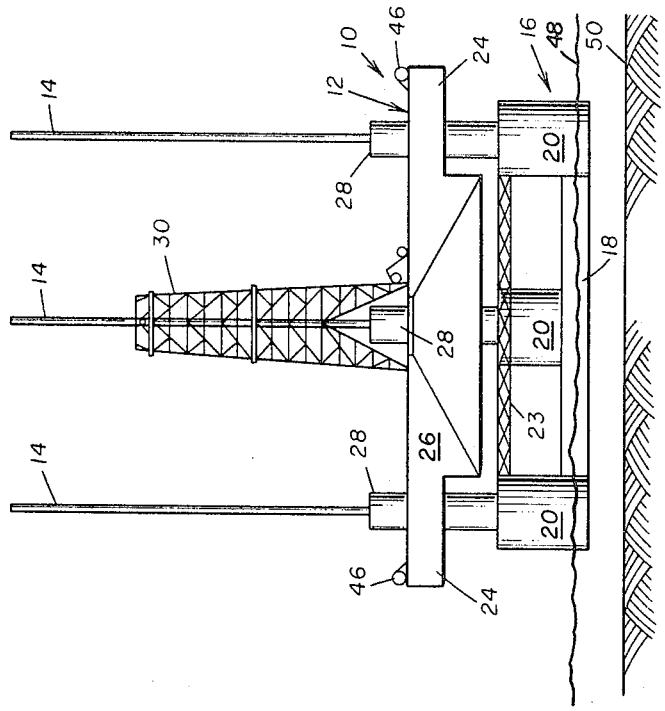

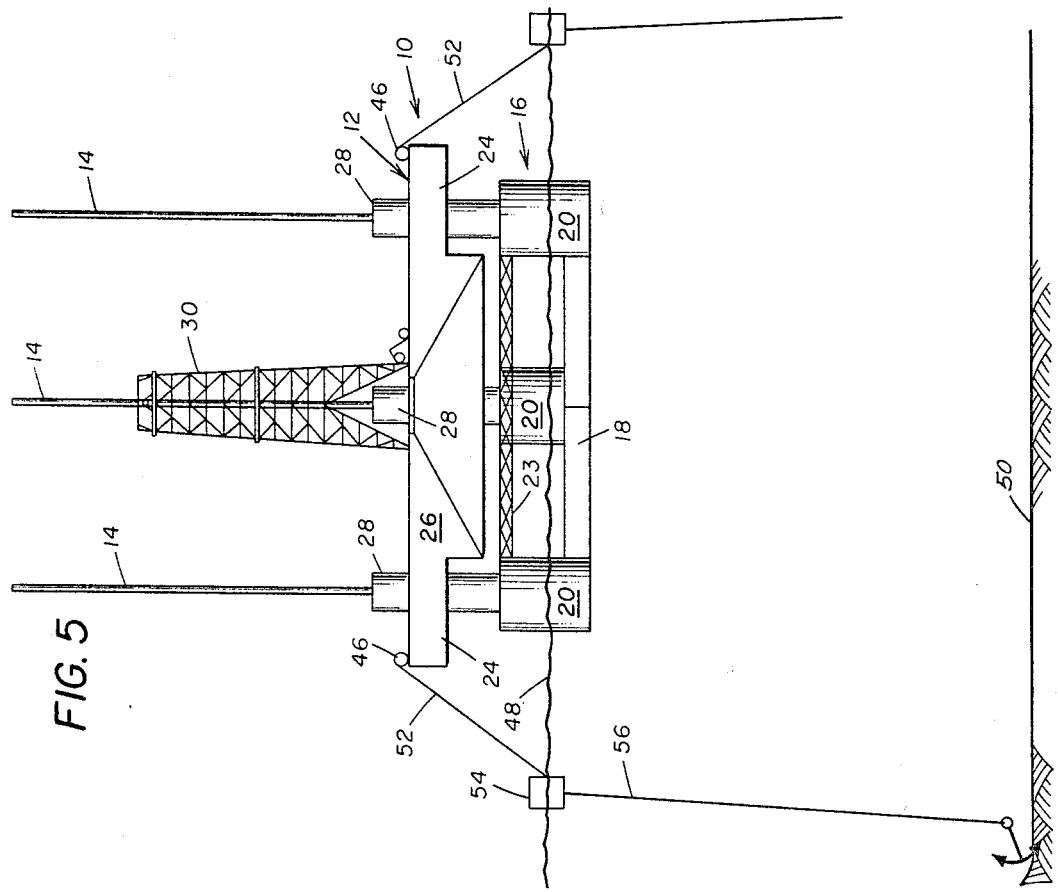

3,433,024
VERSATILE MARINE STRUCTURE
William E. Diamond, Diobu, Port Harcourt, Nigeria, and George W. Perry, Le Vesinet, Yvelines, France, assignors to Mobil Oil Corporation, a corporation of New York
Filed Mar. 31, 1966, Ser. No. 539,050
U.S. Cl. 61—46.5
Int. Cl. B63b *35/44, 21/50*
1 Claim

ABSTRACT OF THE DISCLOSURE

This specification discloses a versatile marine structure, primarily designed for drilling offshore wells, having an upper buoyant deck section, a lower buoyant wave transparent hull section, and jack-up legs between the sections whereby the structure is adapted to be used alternatively as a submerged barge in shallow water, a bottom-supported jack-up platform in intermediate depth water, and as a floating wave transparent vessel in deep water. The structure may also be floated with the lower buoyant wave transparent hull section at the surface of the body of water and the upper buoyant deck section at its lowest position with respect to the lower hull section, when the structure is to be transported through a body of water from one location to another.

---

This invention relates to a versatile structure for drilling exploratory and/or production wells in subaqueous formations underlying bodies of water of substantially all depths. More particularly, the invention relates to a marine drilling platform structure adapted to serve as a bottom-supported, above-surface platform or a transparent drilling vessel, depending on the water depth encountered.

Exploration and production efforts in the oil and gas industry are being extended to remote areas throughout the world as the more accessible and desirable acreage is leased. In the recent drive to discover and tap hydrocarbon deposits beneath the continental shelves and even the more recent developing ability to extend the exploitable regions to the continental slopes, leases have been obtained for such remote offshore areas as the west coast of Africa and the coasts of Australia. Exploration is being conducted in river mouths and bays where the water may be only twenty-five feet deep, in open water on the continental shelf where the water depth ranges up to six hundred feet, and on the continental slope, arbitrarily designated by a water depth of over six hundred feet. In the shallow water river mouths and bays, submerged barges are the most economical and practical foundations for a drilling rig. In water from about thirty-five to about two hundred feet, the jack-up type of bottom-supported platform has found success. In water over three hundred feet the floating drilling vessel is almost exclusively used, due to the practically exponentially rising costs of a bottom-supported platform as the water depth increases. Of the several types of floating drilling vessels in use today, variations of the transparent type have proved the most effective. "Transparent" refers to a vessel designed so that surface waves can travel almost unobstructed therethrough and which will be relatively unaffected thereby.

The cost of one of these offshore structures may exceed five million dollars for a floating transparent unit, several million dollars for a relatively deep water jack-up type, and up to a million dollars for a submersible barge. Since most of the major oil companies do not own their own drilling rigs, they therefore must rent them at a commensurate per diem rate. Furthermore, it has been the practice in this competitive industry to obtain the services of these structures far in advance by contracts extending for several years and it is not usually possible to rent a marine drilling structure on short notice or for an indeterminate duration, which can result in rental payments being due whether these structures are in use or not. An average jack-up structure rents, at standby rates, without crews, for $3,000 to $4,000 per day. At these prices, any unproductive time at the drilling site becomes an important economic consideration. During a drilling program, particularly at a remote lease, a particular drilling structure may stand idle for days because of its unadaptability to the water depth at which drilling is to be conducted at the moment or there may be lost time resulting from moving the drilling structure at the usual slow towing speed, from one lease to another where the water depth at a well to be drilled is within the design range of the marine structure. In many of the remote areas now being considered for exploitation, more than one of the above-enumerated types of drilling structures would be necessary at a single lease, due to the extreme slope of the continental shelf at that point. Thus, it would be economically advantageous if there were a single marine drilling structure that was adaptable to substantially all water depths, to lessen the number of marine drilling structures needed and the resulting unproductive time of those available.

A marine unit used for drilling at the above-discussed remote sites will spend from ninety to two hundred days under tow, from the United States to the foreign destination and back, at the usual towing speed of two or three knots. The cost of transporting so immense a structure across the span of an ocean includes towing charges of $3,000 to $4,000 per day, plus tow insurance. (The above quoted prices were taken from 1964 statistics and are included only to give the reader an idea of the magnitude of the costs involved in the operation of an off-shore drilling structure. It is expected that these costs will rise as labor costs rise.) Therefore, the optimum vessel for drilling in remote foreign areas should have, besides a functional versatility, a shallow draft and a low drag coefficient to increase the towing speed when buoyed up for towing as well as providing the additional advantage of being able to enter shallow harbors, but at the same time it must not extend so far out of the water that it would be unstable.

Accordingly, it is an object of the present invention to provide a marine structure which can be used for drilling and maintaining subaqueous wells in substantially all depths of water.

It is another object of the invention to provide a marine structure combining the advantageous attributes of a floating transparent structure and a bottom-supported platform.

It is still another object of the invention to provide a marine structure that can be realtively economically towed for long distances.

It is a further object of the invention to provide a marine structure that can operate in the open sea.

It is a still further object of the invention to provide a marine structure that can be removed from an above-water completion.

It is another object of the invention to provide a marine structure capable of being spotted over a previously completed subaqueous well.

It is still another object of the invention to provide a marine structure capable of placing heavy platforms.

Other objects and advantages of the invention will be readily apparent from the following description, when taken in conjunction with the accompanying drawings that illustrate a preferred embodiment in accordance with this invention.

The invention is directed to a drilling structure consisting of a lower buoyant transparent hull section and an upper buoyant drilling platform deck section interconnected by jack-up legs upstanding from the transparent hull section and extending through the corners of the upper deck. The transparent hull section comprises a base portion of controlled buoyancy with a planar bottom surface for supporting the entire structure on the marine bottom and has spaced parallel buoyant stabilizing columns extending upwardly therefrom. The jack-up legs are rigidly fixed to the upper ends of the stabilizing columns and extend through jack houses on the deck.

For drilling water of about fifteen to sixty feet the upper platform deck section rests directly on the lower hull section which is flooded until it is supported on the shallow marine bottom. For depths of about sixty feet to about one hundred seventy-five feet the lower hull section is again flooded until it is supported by the marine bottom, the upper deck section being jacked up on the upstanding legs until it is safely out of the water. For depths deeper than about one hundred seventy-five feet the upper deck section rests directly on the stabilizing columns of the lower hull section while it is flooded until the base portion thereof is beneath the surface and only the transparent portion, consisting of the stabilizing columns, breaks the surface of the water. For towing, the structure is made as buoyant as possible to raise the base portion of the lower hull secton to the surface.

FIGURE 2 is a schematic view of the marine drilling structure of the present invention floating near the surface of the body of water as when under tow;

FIGURE 3 is a schematic view of the marine drilling structure of the present invention supported on the marine bottom in shallow water;

FIGURE 4 is a schematic view of the marine drilling structure of the present invention supported on the marine bottom in deeper water necessitating the jacking up of the drilling deck; and FIGURE 5 is a schematic view of the marine drilling structure of the present invention floating, in deep water, in an attitude transparent to surface waves.

Figure 1:
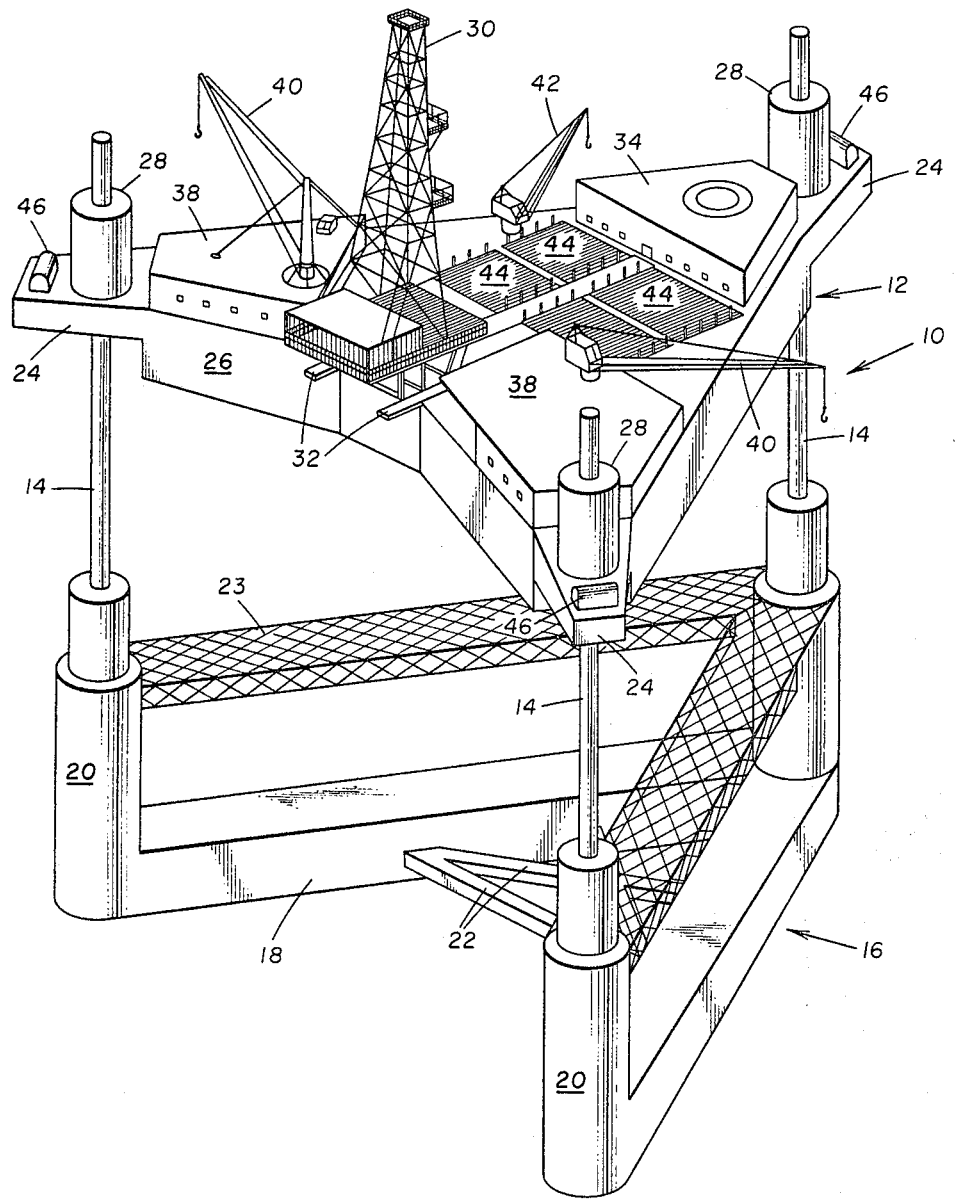
FIGURE 1 is an illustrative view of the marine drilling structure of the present invention.

Now looking at FIGURE 1 there is shown a marine drilling structure, generally designated 10, with an upper platform deck section, generally designated 12, extended 14 as possible to allow the construction of a lower hull section, generally designated 16, to be illustrated. The lower hull section 16 consists of a V shaped base portion almost as far up a plurality of the supporting jack-up legs lels the base portion 18 and rigidly interconnects the upper 18 having three upstanding stabilizing columns 20, one mounted at the apex and one at each of the divergent ends of the V. The base portion 18 is stiffened by a system of braces 22 interconnecting the divergent ends of the V close in near the apex. An upper open V framework 23 parallends of the stabilizing columns 20.

One of the jack-up legs 14 is fixed atop each of the stabilizing columns 20, extending through a corner extension 24 of the upper platform deck 12 and through a jack house 28 mounted thereon, in which the mechanism for controlling the degree of separation between the platform deck section 12 and the lower hull 16 is housed. The specific equipment within the jack houses 28 is not shown, the jacking equipment being of a type known and previously used in conjunction with bottom-supported jack-up platforms (as evidenced by an article in the July 15, 1963, volume of The Oil & Gas Journal, pp. 130–132). The upper platform deck section 12, which is substantially Y shaped, supports a drilling rig 30 mounted on skids 32 overhanging the side of the platform opposite the apex thereof. In each corner of the platform deck 12 is a deck house, the deck house 34 in the apex of the platform deck having a flat roof to be used as a helicopter landing field. The two other deck houses 38 each has a crane 40 mounted on its roof. Another crane 42 is mounted in the space between the three deck houses 34, 38, and the drilling rig 30 to handle pipe 44 racked in the central area. Anchor winches 46 are placed outwardly of the jack houses 28 on each extension corner 24 of the deck 26.

In FIGURE 2 the marine structure 10 is illustrated as floating with the base portion 18 on the surface 48 of a body of water during towing. All of the water has been evacuated from the lower hull section 16 to increase its buoyancy as much as possible. The various controls and manifolding for changing the buoyancy of the lower hull section are omitted to clarify the inventive concept. Such means are quite common in the art. In this position the structure is moved, either by a tug (not shown), or under its own power, by the use of auxiliary motors, to the new location at which it is to be used.

FIGURE 3 illustrates the marine drilling structure 10 as it would be positioned in the shallow water, as found in river mouths and inland bays. The buoyancy of the lower hull section 16 would be reduced until the lower face of the base portion 18 is securely supported on the marine bottom 50 with the upper deck 12 above the surface. In this attitude the marine structure 10 is similar in function to a submergible drilling barge. However, only the stabilizing columns 20 break the water, providing a wave transparent structure.

FIGURE 4 illustrates the marine drilling structure 10 used as a bottom-supported jack-up platform in water too deep for the structure to be used as a submerged barge. In this case the base portion 18 again rests on the marine bottom 50, while the deck section 12 is extended above the water surface 48 by being jacked up on the legs 14. To attain this position the buoyancy of the lower hull 16 is first reduced until the upper buoyant deck 12 is floating on the surface 48 of the water. By using the jack-up legs 14, the lower hull is then lowered down through the water until the marine bottom 50 is reached. By continuing to jack the deck section 12 up the legs 14, the deck 12 is raised up out of the water so that only the legs 14 break the surface 48, providing a wave transparent structure.

In deep water, where a floating structure is needed, as shown in FIGURE 5, the buoyancy of the lower hull section 16 is lowered until the marine drilling structure 10 floats with the base portion 18 underwater and only the stabilizing columns 20 breaking the surface 48, again to form a wave transparent structure. The structure 10 is anchored as by a spring buoy anchoring system with intermediate anchor lines 52 extending from the deck-mounted winches 46 to floating buoys 54 and main anchor lines 56 (one shown) moored in the marine bottom 50. As in the first two discussed arrangements of the structure 10, the deck section 12 rests directly on the lower hull rather than being extended up on the jack-up legs 14.

This drilling structure unit is capable of satisfying all of the stated criteria and would reduce the large costs of mobilizing and demobilizing several different type units, the costs for which will vary from $500,000 to $1,000,000, primarily due to the day rates which must be paid during the time the units are being towed from the point where they were manufactured or in use to the areas in which operations are being considered. The unit can be rigged up over a well which had been completed either above or below water and in the open ocean and by means of the anchoring system is able to pull itself close to or over the well, the adjustable substructure being used to make the final corrections. The cranes are capable of setting bottom-supported platforms as well as heavy well conductor or riser pipes, thus eliminating the necessity of mobilizing and demobilizing a derrick barge. Re-entry of an existing well would become necessary in such cases as the recompletion of a discovery well and early development wells to enable additional completion operations, such as combating sand production, repairing poor cementing, fracturing, etc., which were not known to be required early in the life of the field but were determined from early producing history or from later development well completions. There are also areas where the drilling unit could economically remain in the area as a workover unit, such as deep wells in remote deep-water locations with high producing rates, where a well loss could be economically unattractive. At the present state of development of offshore drilling in foreign areas, complete self-sufficiency would be economically preferable. With the illustrated drilling structure, only a supply-tow boat plus some form of personnel transportation would be required, reducing mobilization, demobilization, and operating costs.

Although the present invention has been described in connection with details of specific embodiments thereof, it is to be understood that such details are not intended to limit the scope of the invention. A particular marine structure, falling within the scope of this invention need not have a Y shaped upper platform deck section, or a V shaped lower hull section for that matter. For example, the upper platform deck section and the lower hull section could be triangular, square, or rectangular. Further, the specific anchoring system described is not essential. If it is advantageous, a dynamic positioning system, as proposed for the drilling platform of the Mohole project could be used. Such a system would have peripheral propulsive units on the lower hull section actuated in response to sonar signals originating at the borehole. The structure, while primarily designed for oil and/or gas drilling and maintenance operations, can obviously serve other functions with modifications. For example, it can be used as a foundation for a mobile lighthouse or a floating radar tower. The terms and expressions employed are used in a descriptive and not a limiting sense and there is not intention of excluding such equivalents, in the invention described, as fall within the scope of the claims. Now having described the apparatus herein disclosed, reference should be had to the claim which follows.

What is claimed is:

1. A marine structure for supporting equipment above the surface of a body of water comprising: a buoyant deck section and an adjustably buoyant hull section; said deck section, having a working deck thereon, adapted to be supported above the surface of a body of water; said hull section having a buoyant lower base portion with enough surface area to support said marine structure on a marine bottom underlying a body of water, and an upper wave transparent portion having a plurality of vertical stabilizing columns fixed above said base portion of said hull section; means connected between said deck section and said hull section to space adjustably vertically apart said aforementioned sections, said means for spacing apart said deck and hull sections being a plurality of vertical jacking legs of smaller cross-sectional area than said stabilizing columns, mounted on said hull section, each of said legs extending upward from the upper end of each of said stabilizing columns, whereby the length of each of said legs is minimized; jacking means mounted on said deck section for cooperating with said jacking legs for moving said deck section vertically, in the axial direction of said legs, and for supporting said deck section on said legs whereby said deck section can be positioned along said legs to accommodate the utilization of said structure in varied depths of water as a bottom-supported or floating structure.

References Cited

UNITED STATES PATENTS

| | | | |
|---|---|---|---|
| 2,774,218 | 12/1956 | Hazak | 61—46.5 |
| 3,169,586 | 2/1965 | Bullard | 175—5 |
| 3,186,499 | 6/1965 | Bullard et al. | 175—5 |
| 2,946,566 | 7/1960 | Samuelson | 61—46.5 X |
| 2,973,046 | 2/1961 | McLean et al. | 61—46.5 X |
| 3,154,039 | 10/1964 | Knapp | 61—46.5 X |
| 3,207,110 | 9/1965 | Laborde et al. | 61—46.5 |
| 3,246,476 | 4/1966 | Wolff | 61—46.5 |

FOREIGN PATENTS 991,247 5/1965 Great Britain.

JACOB SHAPIRO, *Primary Examiner.*

U.S. Cl. X.R.

29—25.42

UNITED STATES PATENT OFFICE
CERTIFICATE OF CORRECTION

Patent No. 3,433,024                                        March 18, 1969

William E. Diamond et al.

It is certified that error appears in the above identified patent and that said Letters Patent are hereby corrected as shown below:

Column 2, line 56, "realtively" should read -- relatively --. Column 3, line 46, after "extended" insert -- almost as far up a plurality of the supporting jack-up legs --; line 50, cancel "almost as far up a plurality of the supporting jack-up legs"; line 51, cancel "lels the base portion 18 and rigidly interconnects the upper"; line 56, cancel "paral-" and insert -- parallels the base portion 18 and rigidly interconnects the upper --. Column 5, line 35, "not" should read -- no --.

Signed and sealed this 7th day of April 1970.

(SEAL)
Attest:

Edward M. Fletcher, Jr.                                  WILLIAM E. SCHUYLER, JR.

Attesting Officer                                                   Commissioner of Patents